(12) United States Patent
Mal (10) Patent No.: US 12,430,211 B2
(45) Date of Patent: Sep. 30, 2025

(54) AUTOMATIC NFV SERVICE CHAIN FAILURE RECOVERY DUE TO COMPUTE NODE FAILURES

(71) Applicant: ADTRAN NETWORKS SE, Meiningen Ot Dreissigacker (DE)

(72) Inventor: Manas Kumar Mal, Bangalore (IN)

(73) Assignee: ADTRAN NETWORKS SE, Meiningen Ot Dreissigacker (DE)

( * ) Notice: Subject to any disclaimer, the term of this patent is extended or adjusted under 35 U.S.C. 154(b) by 0 days.

(21) Appl. No.: 18/777,491

(22) Filed: Jul. 18, 2024

(65) Prior Publication Data
US 2025/0045166 A1 Feb. 6, 2025

(30) Foreign Application Priority Data
Aug. 2, 2023 (EP) .................................... 23189334

(51) Int. Cl.
*G06F 12/00* (2006.01)
*G06F 11/14* (2006.01)
*H04L 43/20* (2022.01)

(52) U.S. Cl.
CPC ...... *G06F 11/1448* (2013.01); *G06F 11/1484* (2013.01); *H04L 43/20* (2022.05)

(58) Field of Classification Search
CPC ............ G06F 11/1448; G06F 11/1484; G06F 11/1446; G06F 3/061; G06F 3/0614; G06F 3/0647; G06F 3/065; G06F 3/0653; G06F 3/0662; G06F 3/0683; G06F 9/45533; H04L 43/20
See application file for complete search history.

(56) References Cited

U.S. PATENT DOCUMENTS

2013/0067465 A1 3/2013 Fuhrman et al.
2017/0279668 A1* 9/2017 Shevenell ............. H04L 41/064
(Continued)

FOREIGN PATENT DOCUMENTS

WO WO 2020/072338 A1 4/2020

OTHER PUBLICATIONS

Extended European Search Report for European Patent Application Serial No. 23189334.8 (Jan. 31, 2024).

*Primary Examiner* — Shawn X Gu
(74) *Attorney, Agent, or Firm* — Jenkins, Taylor & Hunt, P.A.

(57) ABSTRACT

A computer-implemented method and system for providing an automatic recovery of at least one service chain including interlinked virtual functions of a cloud computing system is provided. One method includes generating backups of the virtual machines on which virtual functions of the service chain are deployed to provide snapshot states of the respective virtual machines. The method further includes monitoring a status of resources of the compute nodes hosting the virtual machines on which virtual functions of the service chain are deployed to detect failed resources of the compute nodes. The method further includes allowing over-allocation of resources and performing a repositioning of virtual machines on which virtual functions of the service chain are deployed from the detected failed resources to other working resources of the compute nodes of the service chain and initializing the repositioned virtual machines of the service chain to their last snapshot states.

21 Claims, 7 Drawing Sheets

(56) References Cited

U.S. PATENT DOCUMENTS

2019/0394081 A1    12/2019  Tahhan et al.
2021/0184925 A1*    6/2021  Narayanan .......... H04L 41/0816
2021/0240511 A1*    8/2021  Manas ................. G06F 9/5016

* cited by examiner

AUTOMATIC NFV SERVICE CHAIN FAILURE RECOVERY DUE TO COMPUTE NODE FAILURES

PRIORITY CLAIM

This application claims the priority benefit of European Patent Application No. 23189334.8, filed Aug. 2, 2023, the disclosure of which is incorporated herein by reference it its entirety.

FIELD OF THE INVENTION

The invention relates to a computer-implemented method and apparatus for providing automatic recovery of a service chain, in particular a network functions virtualization (NFV) service chain, due to compute node failures.

BACKGROUND OF THE INVENTION

Service chaining is a concept that addresses the fact that, in many of the targeted services for network functions virtualization (NFV), end-to-end data streams pass through a sequence of functions.

Network functions virtualization (NFV) refers to an overarching concept as a framework for running software-defined network functions. Virtual Network Functions (VNF) are the implementation of a network function by utilizing a software decoupled from the underlying hardware infrastructure. VNFs are virtualized network services running on open source computing platforms independent of hardware technology. Common VNFs include virtualized routers, firewalls, WAN optimization, and network address translation (NAT) services. Most VNFs are run in virtual machines (VMs) on common virtualization infrastructure software such as Openstack, VMWare or KVM.

Cloud applications may run on VMs hosted by a set of compute nodes (i.e. servers). A given application may span multiple compute nodes (CNs). For example, an NFV service chain is a series of VMs, and may reside on multiple CN. A single CN failure, i.e. a failure of a single CN, will cause any hosted VMs or associated service chains to move to a failed state.

In a local cloud architecture (network edge cloud), the NFV service chain spans across multiple compute nodes. If there is a single CN failure (unless the VNF HA is built with additional compute nodes), the service chain moves to a failed state as well.

One of the conventional ways to avoid a service chain failure is to provide additional spare CNs to host the standby VNFs. Another conventional approach is to use a predictive model to identify a compute node failure condition at a CN and to bring up a new replacement CN before the affected CN fails. This approach is based on monitoring of the CNs of the network or cloud and proactively moving the VM hosted by a CN having an observed critical state to another CN before the affected critical CN breaks. The status of the CNs is monitored and the workload of a critical CN is moved to another CN before failure.

However, these conventional approach require accurate prediction and reserved resources for remediation. This does cause unnecessary overhead in case the CNs continue to work properly. Further, these conventional approaches are not able to handle a scenario where an unpredicted failure occurs. Predictive methods can achieve a migration before a failure, but these approaches are not fully reliable.

Another conventional approach is to provide additional resources available in a resource pool, to take care of moving the VNFs from a failed CN to other CNs in the same resource pool. This approach also requires reserved resources for remediation. The VNFs on the failed CN are restored to their latest state when running with a High Availability mode (with additional CNs). However, in case the VNF is not running with High Availability mode and a CN hosting the VNF fails, then there is no way to bring back the VNF to its running latest state unless a replacement CN is added to the cluster resulting in an unwanted down time and requiring human intervention. High Availability deployments provide resilience at the cost of duplicating all CNs. In this way a recovery can be achieved after a failure of a CN, however the current conventional deployments restore only the initial (day 0) configuration, not the latest runtime configuration.

Most providers of real-time communications align with service levels that provide availability from 99.9% to 99.999%. Depending on the required degree of high availability increasingly sophisticated measures along the full lifecycle of the application must be taken. There are different conventional measures to achieve a robust degree of high availability. The system or network is preferably designed to have no single point of failure (SPOF). Automated monitoring, failure detection, and failover mechanisms for both stateless and state-full components can be employed. SPOFs can be commonly eliminated with an N+1 or 2N redundancy configuration, where N+1 is achieved via load balancing among active-active nodes, and 2N is achieved by a pair of CNs in active-standby configuration.

One can make use of a scalable, load balanced cluster or can assume an active-standby pair. Operating procedures can be provided for manual mechanisms to respond to, mitigate, and recover from a failure. However, these conventional measures also require reserved resources for remediation. The VNFs on the failed CN are restored to their latest state when running with high availability mode (with additional CNs). In case the VNF is not running with high availability mode and the CN hosting the VNF fails, then there is no way to bring back the VNF to running latest state unless a replacement CN is added to the cluster resulting in down time and requiring human intervention.

SUMMARY OF THE INVENTION

Accordingly, it is one of the ideas of the present invention to provide a method and apparatus to provide an automatic and reliable service chain recovery in response to a compute node failure without requiring a provision of standby compute nodes and minimizing downtime.

The invention provides, according to a first aspect, a computer-implemented method for providing an automatic recovery of at least one service chain comprising interlinked virtual functions of a cloud computing system, wherein the method comprises the steps of:

generating backups of the virtual machines (VMs) on which virtual functions of the service chain are deployed to provide snapshot states of the respective VMs;

monitoring a status of resources of the compute nodes (CNs) hosting the VMs on which virtual functions of the service chain are deployed to detect failed resources of the CNs;

allowing over-allocation of resources and performing a repositioning of VMs on which virtual functions of the service chain are deployed from the detected failed resources to other working resources of the CNs of the service chain; and initializing the repositioned VMs of the service chain to their last snapshot states.

In a possible embodiment of the computer-implemented method, the service chain comprises a network function virtualization (NFV) service chain including interlinked virtual network functions (VNFs) deployed as VMs across multiple CNs of the cloud computing system.

In a possible embodiment of the computer-implemented method, the resources of the CNs comprise different resource types including computational resources, memory resources, hard disk resources and networking resources.

In a possible embodiment of the computer-implemented method, for each resource type an associated resource allocation ratio (RAR) is provided indicating a ratio between virtual resources allocated to a VM and available physical resources.

In a possible embodiment of the computer-implemented method, the CNs belong to host aggregates (HAs) each including CNs having a common attribute or common capability.

In a possible embodiment of the computer-implemented method, in case that a compute node failure of a CN assigned to a HA is detected a resource capacity in the respective HA is evaluated and RARs of one or more resource types in the respective HA are increased temporarily to accommodate the VNFs of the failed CN.

In a possible embodiment of the computer-implemented method, if a compute node failure of a CN assigned to a HA is detected VNFs of the failed CN are launched from the failed CN to at least one other CN of the respective HA.

In a possible embodiment of the computer-implemented method, the VNFs launched from the failed CN to the other compute node of the respective HA are rebuilt automatically using the last backup of the VMs of the failed CN.

In a possible embodiment of the computer-implemented method, the failed CN is replaced by another replacement compute node added to the respective HA.

In a possible embodiment of the computer-implemented method, the replacement CN added to the respective HA is automatically discovered.

In a possible embodiment of the computer-implemented method, resource capacities of the discovered replacement CN and of the other CNs of the respective HA are determined.

In a possible embodiment of the computer-implemented method, a workload of CNs of the respective HA is rebalanced automatically by a Network Functions Virtualization (NFV) Management and Orchestration (MANO) layer to restore the original RAR in the respective HA by migration of VNFs to the discovered replacement CN on the basis of the determined resource capacities.

In a possible embodiment of the computer-implemented method, the cloud computing system comprises a customer edge cloud provided at a customer premise with a localized cloud control provided by local cloud controllers of the customer edge cloud.

In a possible embodiment of the computer-implemented method, the backups of the VMs of the service chain are generated periodically and/or in response to a configuration change of a VNF of the service chain deployed as VMs across CNs of said cloud computing system.

The invention further provides, according to a second aspect, a cloud computing system comprising interlinked virtual network functions (VNFs) of a service chain deployed as virtual machines (VMs) across compute nodes (CNs) of the cloud computing system hosting the virtual machines (VMs), the cloud computing system comprising:
   a backup generation unit adapted to generate backups of the VMs of the service chain to provide snapshot states of the respective VMs;
   a failure detection unit adapted to monitor a status of resources of the CNs of the service chain to detect failed resources of the CNs; and
   an orchestration unit adapted to perform a reallocation of resources and a repositioning of VMs of the service chain from the failed resources detected by the failure detection unit to other working resources of the CNs of the service chain and to adapted to initialize the repositioned VMs of the service chain to their last snapshot states provided by the backup generation unit.

In a possible embodiment of the cloud computing system, the resources of the CNs comprise different resource types including computational resources, memory resources, hard disk resources and networking resources and wherein for each resource type an associated resource allocation ratio (RAR) is provided indicating a ratio between virtual resources allocated to a VM and available physical resources.

In a possible embodiment of the cloud computing system, the CNs belong to HAs each including CNs having a common attribute or common capability.

In a possible embodiment of the cloud computing system, if a compute node failure of a CN assigned to a HA is detected by the failure detection unit of the cloud computing system a resource capacity in the respective HA is evaluated and RARs of one or more resource types in the respective HA are increased temporarily by the orchestration unit of the cloud computing system to accommodate the VNFs of the service chain deployed on VMs hosted by the failed CN.

In a possible embodiment of the cloud computing system, if a compute node failure of a CN assigned to a HA is detected by the failure detection unit of the cloud computing system VNFs of the service chain deployed on VMs hosted by the failed CN are launched by the orchestration unit of the cloud computing system from the failed CN to at least one other compute node of the respective HA.

In a possible embodiment of the cloud computing system, the VNFs launched from the failed CN to the other CN of the respective HA are rebuilt automatically using the last backup of the VMs of the failed CN provided by the backup generation unit of the cloud computing system.

In a possible embodiment of the cloud computing system, the failed CN detected by the failure detection unit of the cloud computing system is replaced by another replacement CN added to the respective HA.

In a possible embodiment of the cloud computing system, the replacement CN added to the respective HA is automatically discovered and resource capacities of the discovered replacement CN and of the other CNs of the respective HA are determined.

In a possible embodiment of the cloud computing system, a workload of CNs of the respective HA is rebalanced automatically by the orchestration unit of the cloud computing system to restore the original RAR in the respective HA by migration of VNFs to the discovered replacement compute node on the basis of the determined resource capacities.

In a possible embodiment of the cloud computing system, the cloud computing system comprises a customer edge cloud provided at a customer premise with a localized cloud control provided by local cloud controllers of the customer edge cloud.

In a possible embodiment of the cloud computing system, the backups of the VMs of the service chain are generated by the backup generation unit of the cloud computing system periodically and/or in response to a configuration change of a VNF of the service chain deployed as VMs across CNs of said cloud computing system.

In a possible embodiment of the cloud computing system, the orchestration unit of the cloud computing system comprises a Network Functions Virtualization (NFV) Management and Orchestration (MANO) layer adapted to restore the original RAR in the respective HA by migration of VNFs to the discovered replacement CN on the basis of determined resource capacities.

BRIEF DESCRIPTION OF THE DRAWINGS

In the following possible embodiments of the different aspects of the present invention are described in more detail with reference to the enclosed figures.

DETAILED DESCRIPTION OF CERTAIN EMBODIMENTS OF THE INVENTION

Figure 1:
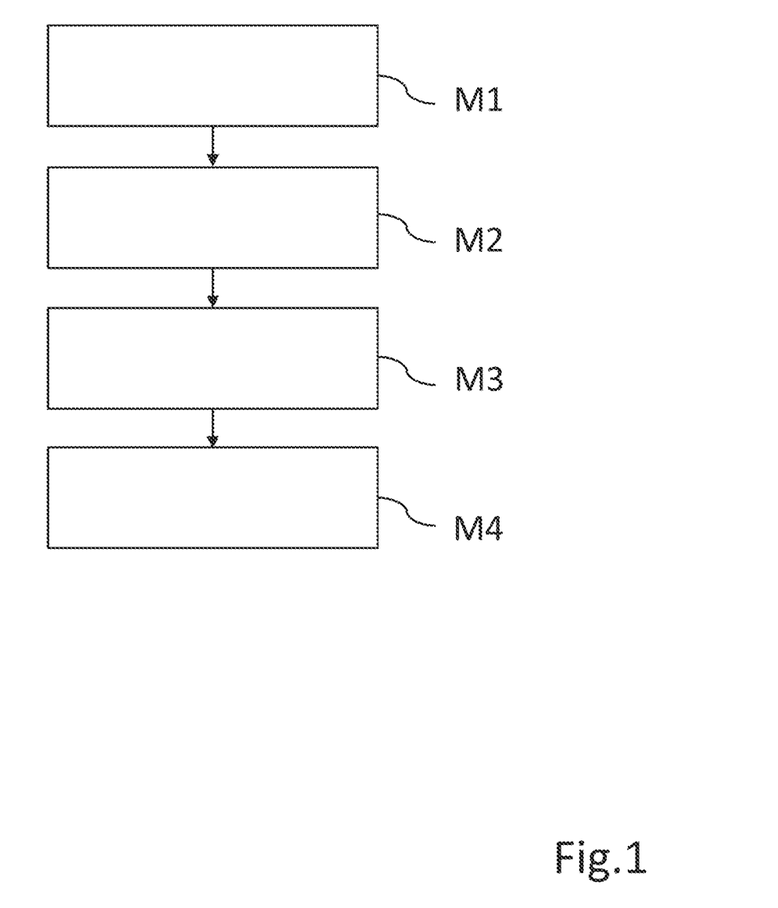
FIG. 1 shows a flowchart of a possible exemplary embodiment of the computer-implemented method according to a first aspect of the present invention.

FIG. 1 illustrates a flowchart of a possible exemplary embodiment of the computer-implemented method according to a first aspect of the present invention including several main steps M1, M2, M3, M4.

Figure 5:
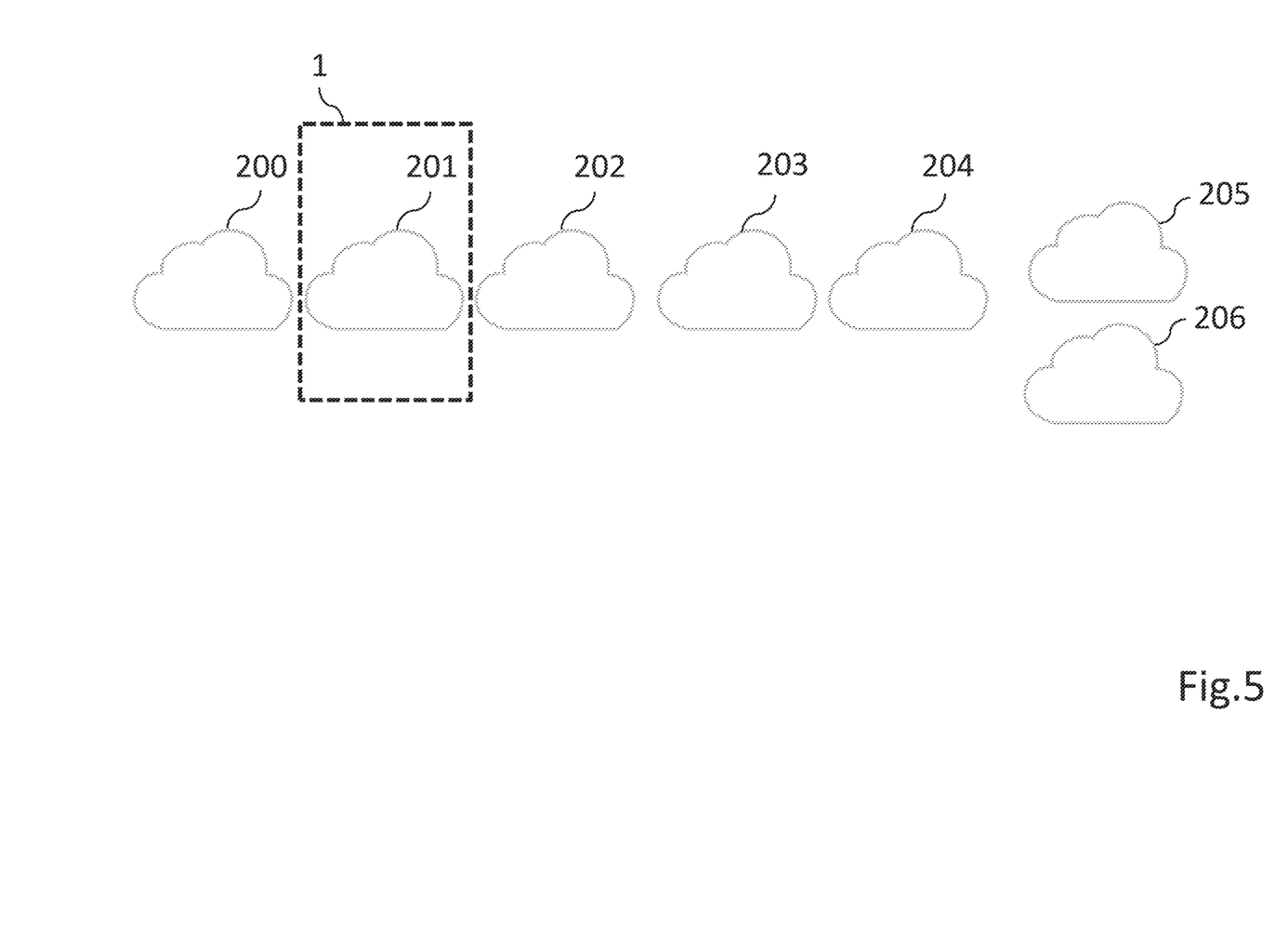
FIG. 5 shows a schematic diagram to illustrate a possible use case of the computer-implemented method according to the present invention.

The invention provides according to a first aspect a computer-implemented method for providing an automatic recovery of at least one service chain SC comprising interlinked virtual functions of a cloud computing system 1. The cloud computing system 1 can comprise a customer edge cloud provided at a customer premise as shown in FIG. 5. The customer edge cloud can have a localized cloud control provided by local cloud controllers of the customer edge cloud.

The method comprises in the illustrated embodiment of FIG. 1 the steps M1 to M4.

In a first step M1 backups of the virtual machines VMs on which virtual functions of the service chain SC are deployed are generated to provide snapshot states of the respective virtual machines VMs. The backups of the virtual machines VMs of the service chain SC can be generated periodically and/or in response to a configuration change of a virtual network function VNF of the service chain SC deployed as virtual machines VMs across compute nodes CNs of said cloud computing system. The backups can be generated by a backup algorithm.

In a further step M2 a status of resources of the compute nodes CNs hosting the virtual machines VMs on which virtual functions of the service chain SC are deployed are monitored to detect failed resources of the compute nodes CNs. A failure detection algorithm can monitor the status of the components. The failure detection algorithm can run independently from the backup algorithms, i.e. steps M1, M2 can be performed also in parallel.

In a further step M3 over-allocation of resources is allowed and a repositioning of virtual machines VMs on which virtual functions of the service chain SC are deployed is performed. The virtual machines VMs are repositioned or migrated from the detected failed resources to other working resources of the compute nodes CNs of the affected service chain SC.

Finally in step M4 the repositioned virtual machines VMs of the service chain SC are initialized to their last snapshot states generated in step M1.

The computer-implemented method allows to survive a NFV service chain disruption in case of a compute node failure of a compute node CN without employment of a standby compute node by leveraging a resource over-commitment in the host aggregate HA of the failed compute node CN.

In a possible embodiment of the computer-implemented method the service chain SC comprises a network function virtualization, NFV, service chain (NFV-SC) including interlinked virtual network functions VNFs deployed as virtual machines (VMs) across multiple compute nodes CNs of the cloud computing system.

The service chain SC is a sequence of VNFs adapted to replace a chain of premises equipment. Since physical devices are plugged into each other the service chain SC replicates that process. This means each of the software VNFs does expose a pair of interfaces that can be connected to the rest of the service chain SC. The VNFs selected for on-boarding into a service chain SC support compatible connectivity. Furthermore, the interfaces are suitable for network connection when the service chain SC is deployed. Using a tunneling protocol between VNFs in the service chain SC allows to determine the order of connection and doesn't require changes to the VNFs. The same is true if the VNFs are connected using explicit software-defined network control.

The resources of the compute nodes CNs can comprise different resource types including computational resources, memory resources, hard disk resources and networking resources. For each resource type an associated resource allocation ratio (RAR) is provided indicating a ratio between virtual resources allocated to a virtual machine (VM) and available physical resources.

In a possible embodiment of the computer-implemented method the compute nodes CNs of the cloud computing system belong to host aggregates HAs each including compute nodes CNs having a common attribute or common capability. In case that a compute node failure of a compute node CN assigned to a host aggregate HA is detected in step M2 a resource capacity in the respective host aggregate HA is evaluated and resource allocation ratios (RARs) of one or more resource types in the respective host aggregate HA are increased temporarily to accommodate the virtual network functions VNFs of the failed compute node CN. If a compute node failure of a compute node CN assigned to a host aggregate HA is detected is step M2 virtual network functions VNFs of the failed compute node CN are launched in step M3 from the failed compute node CN to at least one other compute node CN of the respective host aggregate HA. The virtual network functions VNFs launched from the failed compute node CN to the other compute node CN of the respective host aggregate HA are rebuilt automatically using the last backup of the virtual machines VMs of the failed compute node CN.

In a possible embodiment of the computer-implemented method the failed compute node CN is replaced in a further step (not illustrated in FIG. 1) by another replacement compute node CNnew added to the respective host aggregate HA. The replacement compute node CNnew added to the respective host aggregate HA can be automatically discovered. Resource capacities of the discovered replacement compute node CNnew and of the other compute nodes CNs of the respective host aggregate HA are determined.

A workload of compute nodes CNs of the respective host aggregate HA can be rebalanced automatically by a Network Functions Virtualization (NFV) Management and Orchestration (MANO) layer to restore the original resource allocation ratio RAR in the respective host aggregate HA by migration of virtual network functions VNFs to the discovered replacement compute node on the basis of the determined resource capacities.

Figure 2:
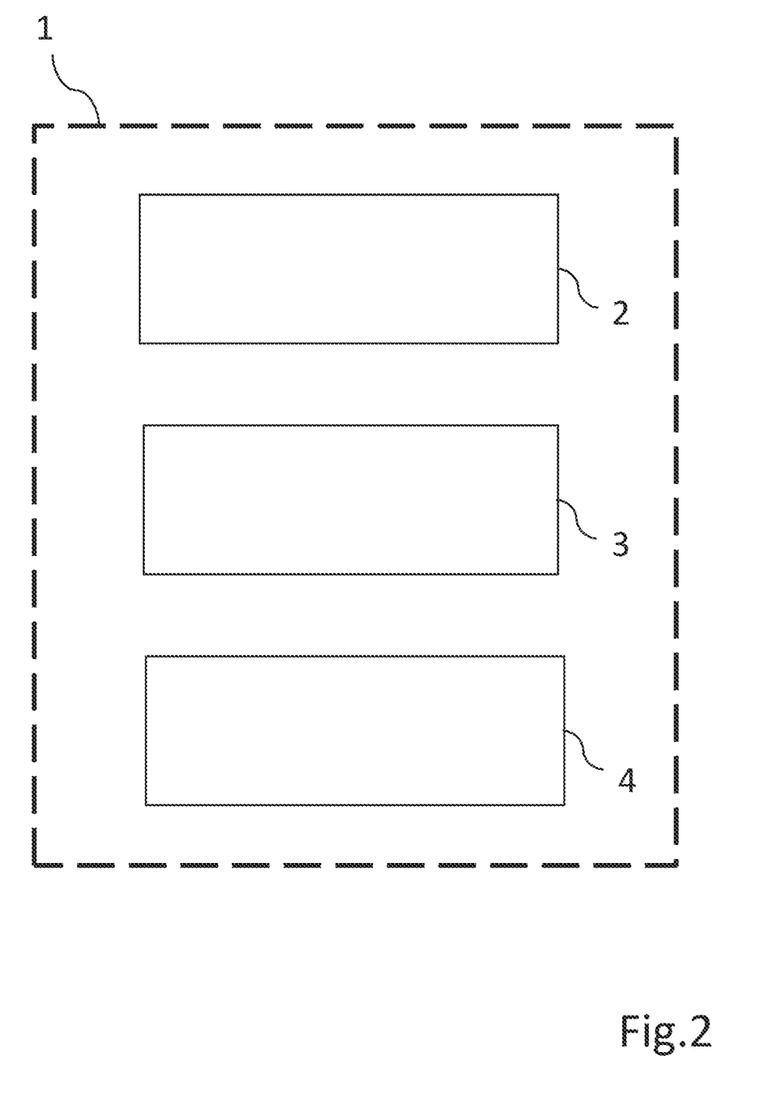
FIG. 2 shows a block diagram of a possible exemplary embodiment of cloud computing system according to a second aspect of the present invention.

As shown in the block diagram of FIG. 2 the invention provides according to a further aspect a cloud computing system 1 comprising interlinked virtual network functions VNFs of a service chain SC deployed as virtual machines VMs across compute nodes CNs of the cloud computing system 1 hosting the virtual machines VMs. The cloud computing system 1 shown in FIG. 2 comprises a backup generation unit 2, a failure detection unit 3 and an orchestration unit 4. The cloud computing system 1 can comprise a customer edge cloud provided at a customer premise with a localized cloud control provided by local cloud controllers of the customer edge cloud as shown in FIG. 5.

In an exemplary implementation VM resource configuration defaults can be as following:

4 CPU Cores (computational resources)
16 GB RAM (memory resources)
40 GB hard disk (pre-formatted) (hard disk resources)
8 interfaces (networking resources)

Resources can be shared and abstracted making use of virtualization techniques.

The backup generation unit 2 of the cloud computing system 1 is adapted to generate backups of the virtual machines VMs of the service chain SC to provide snapshot states of the respective virtual machines VMs. In a possible embodiment of the cloud computing system 1 the backups of the virtual machines VMs of the service chain SC are generated periodically by the backup generation unit 2 of the cloud computing system 1. In a further embodiment of the cloud computing system 1 the backups of the virtual machines VMs of the service chain SC are generated by the backup generation unit 2 of the cloud computing system 1 in response to a configuration change of a virtual network function VNF of the service chain SC deployed as virtual machines VMs across compute nodes CN of said cloud computing system 1.

The failure detection unit 3 of the cloud computing system 1 is adapted to monitor a status of resources of the compute nodes CNs of the service chain to detect failed resources of the compute nodes CNs.

The orchestration unit 4 of the cloud computing system 1 is adapted to perform a reallocation of resources and a repositioning of virtual machines VMs of the service chain SC from the failed resources detected by the failure detection unit 3 to other working resources of the compute nodes CNs of the service chain SC and is adapted to initialize the repositioned virtual machines VMs of the service chain SC to their last snapshot states provided by the backup generation unit 2. In a possible embodiment of the cloud computing system 1 the orchestration unit 4 of the cloud computing system 1 comprises a Network Functions Virtualization (NFV) Management and Orchestration (MANO) layer adapted to restore the original resource allocation ratio RAR in the respective host aggregate HA by migration of virtual network functions VNFs to the discovered replacement compute node CNnew on the basis of determined resource capacities.

In a possible embodiment of the cloud computing system 1 the resources of the compute nodes CNs comprise different resource types including computational resources, memory resources, hard disk resources and networking resources. For each resource type an associated resource allocation ratio RAR is provided indicating a ratio between virtual resources allocated to a virtual machine VM and available physical resources.

In a possible embodiment of the cloud computing system 1 the compute nodes CNs belong to host aggregates HAs each including compute nodes CNs having a common attribute or common capability. If a compute node failure of a compute node CN assigned to a host aggregate HA is detected by the failure detection unit 3 of the cloud computing system 1 a resource capacity in the respective host aggregate HA is evaluated and resource allocation ratios RARs of one or more resource types in the respective host aggregate HA are increased temporarily by the orchestration unit 4 of the cloud computing system 1 to accommodate the virtual network functions VNFs of the service chain SC deployed on virtual machines VMs hosted by the failed compute node CN. If a compute node failure of a compute node CN assigned to a host aggregate HA is detected by the failure detection unit 3 of the cloud computing system 1 virtual network functions VNFs of the service chain SC deployed on virtual machines VMs hosted by the failed compute node CN are launched by the orchestration unit 4 of the cloud computing system 1 from the failed compute node CN to at least one other compute node CN of the respective host aggregate HA. The virtual network functions VNFs launched from the failed compute node CN to the other compute node of the respective host aggregate HA are rebuilt automatically using the last backup of the virtual machines VMs of the failed compute node CN provided by the backup generation unit 2 of the cloud computing system 1.

In a possible embodiment of the cloud computing system 1 the failed compute node CN detected by the failure detection unit 3 of the cloud computing system 1 is replaced by another replacement compute node CNnew added to the respective host aggregate HA. The replacement compute node CNnew added to the respective host aggregate HA can be automatically discovered. The resource capacities of the discovered replacement compute node CNnew and of the other compute nodes CNs of the respective host aggregate HA are determined. In a possible embodiment of the cloud computing system 1 a workload of compute nodes CNs of the respective host aggregate HA is rebalanced automatically by the orchestration unit 4 of the cloud computing system 1 to restore the original resource allocation ratio RAR in the respective host aggregate HA by migration of virtual network functions VNFs to the discovered replacement compute node CNnew on the basis of the determined resource capacities. A Network Functions Virtualization (NFV) Management and Orchestration (MANO) layer is adapted to restore the original resource allocation ratio RAR in the respective host aggregate HA by migration of virtual network functions VNFs to the discovered replacement compute node CNnew on the basis of determined resource capacities.

Figure 3A:
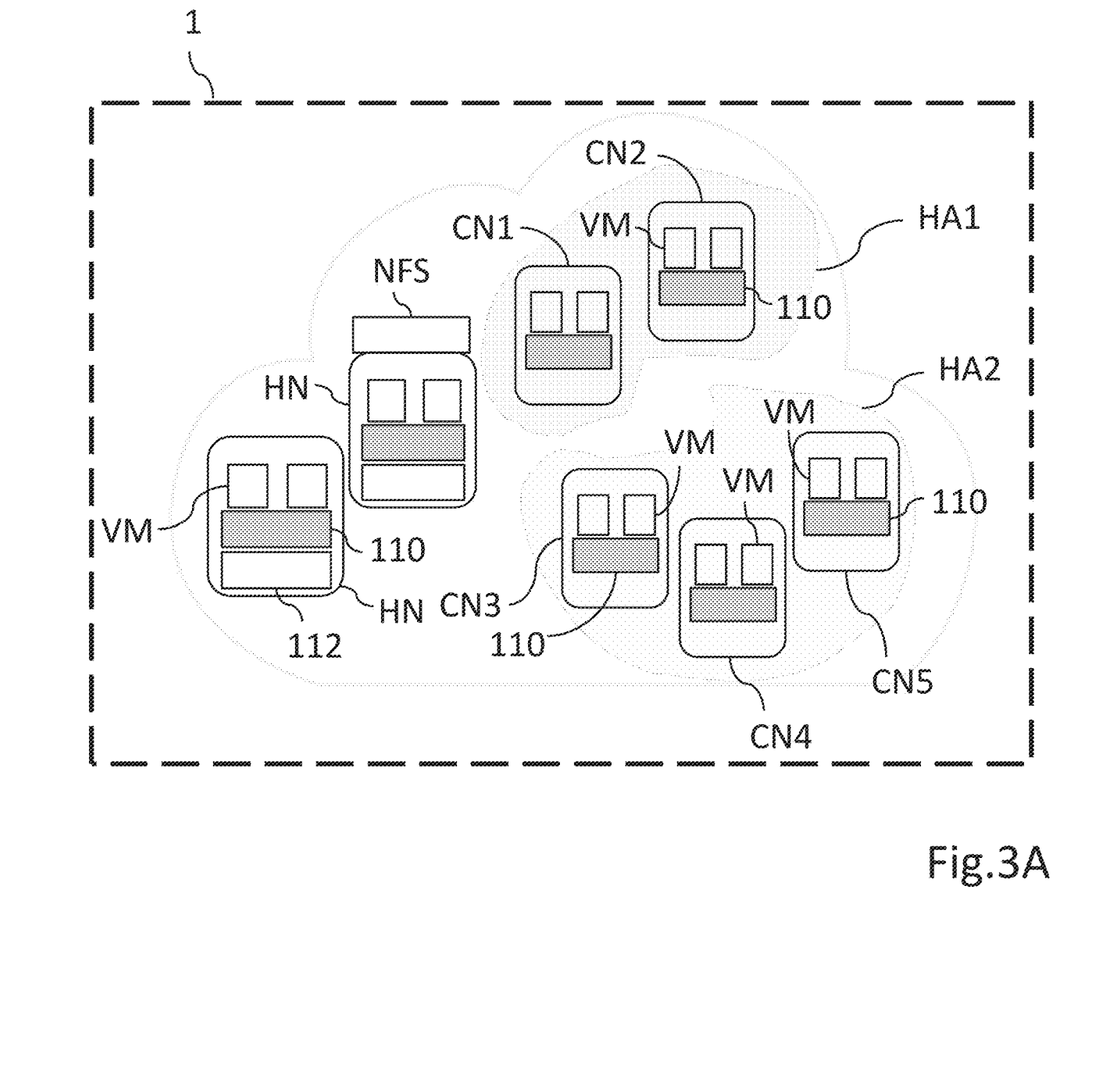
FIGS. 3A, 3B, 3C show schematic diagrams of an exemplary cloud computing system to illustrate the operation of the computer-implemented method of the present invention.
Figure 3B:
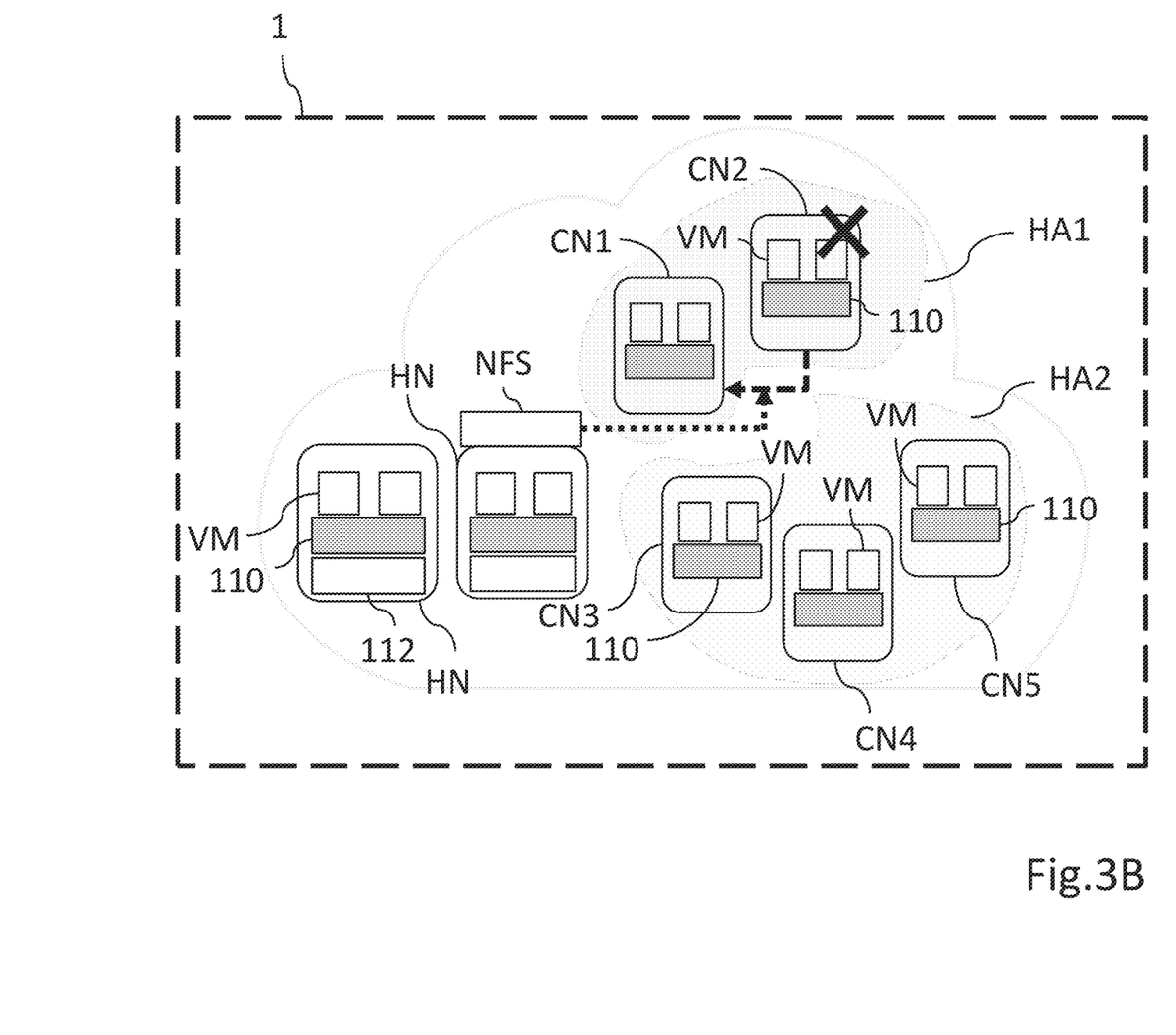
Figure 3C:
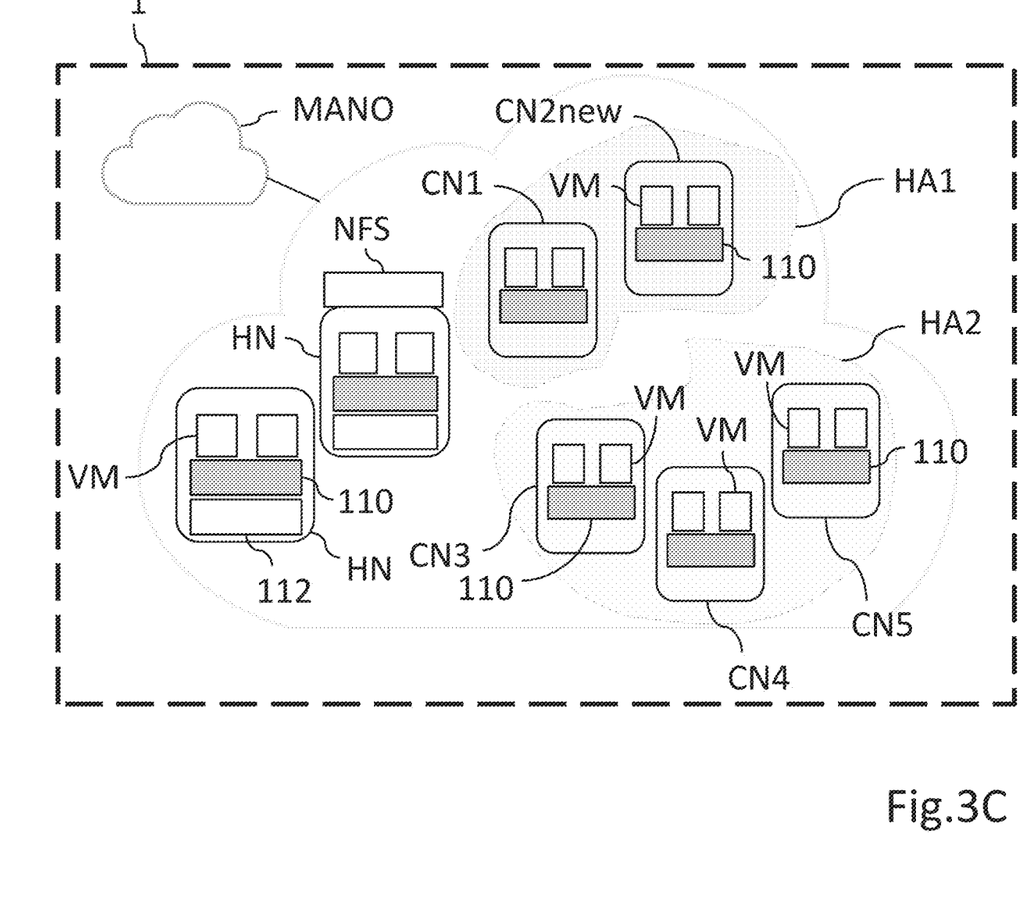
Figure 4:
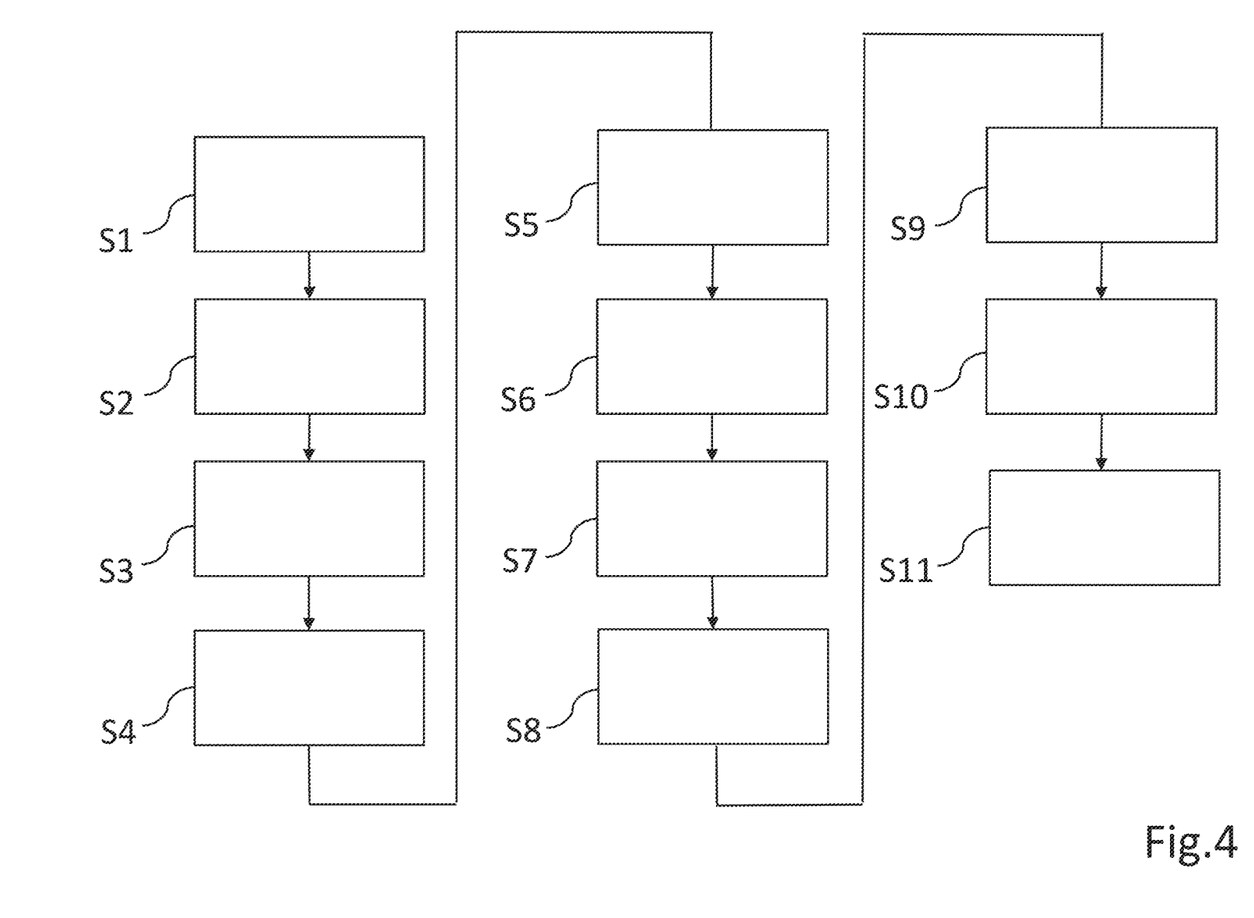
FIG. 4 shows a flowchart of a possible exemplary embodiment of the computer-implemented method according to a first aspect of the present invention.

FIGS. 3A, 3B, 3C show schematic diagrams of an exemplary cloud computing system 1 to illustrate the operation of the computer-implemented method of the present invention as illustrated in the flowcharts of FIG. 1 and FIG. 4. In the illustrated embodiment the cloud computing system 1 comprises an edge cloud provided at a customer premise with a localized cloud control provided by local cloud controllers of the customer edge cloud as shown in FIGS. 3, 5.

The description makes reference to compute nodes CNs, host aggregates HAs and availability zones AZs which can be defined as follows.

Compute Node CN: The cloud provided host that supplies computing, memory and storage for virtual machines VMs.

Host Aggregate HA: Group of Compute nodes CNs having similar hardware characteristics under a same host aggregate HA.

Availability Zone AZ: Group of host aggregates HAs forms an availability zone AZ to achieve redundancy.

A cloud administrator can partition a compute deployment into logical groups for performance or administrative purposes.

A host aggregate HA is a grouping of compute nodes CNs into a logical unit based on attributes such as the hardware or performance characteristics. One can assign a compute node CN to one or more host aggregates HAs. It is possible to map flavors and images to host aggregates HAs by setting metadata on the host aggregate HA, and then matching flavor extra specs or image metadata properties to the host aggregate metadata. A compute scheduler can use this metadata to schedule instances when the required filters are enabled. Metadata that are specified in a host aggregate HA limits the use of that host to any instance that has the same metadata specified in its flavor or image. One can configure weight multipliers for each host aggregate HA by setting a weight_multiplier configuration option in the host aggregate metadata. Host aggregates HAs can be used to handle load balancing, enforce physical isolation or redundancy, group servers with common attributes, or separate classes of hardware. When a host aggregate HA is created it is possible to specify a zone name. This name is presented to cloud users as an availability zone AZ that they can select.

An availability zone AZ is the cloud user view of a host aggregate HA. A cloud user cannot view the compute nodes CNs in the availability zone AZ, or view the metadata of the availability zone AZ. The cloud user can normally only see the name of the availability zone AZ. Each compute node CN can only be assigned to only one availability zone AZ. One can configure a default availability zone AZ where instances will be scheduled in case that the cloud user does not specify a zone. It is also possible direct cloud users to use availability zones AZs that have specific capabilities. A cloud administrator can create as many host aggregates HAs as required. The cloud administrator can create an availability zone AZ that cloud users can select when they create an instance.

An availability zone AZ of a cloud computing system 1 can have multiple hosts (=compute nodes CNs), but a particular host can exist in only one availability zone AZ. Each availability zone AZ has one or more host aggregates HAs. Each host aggregate HA can have multiple hosts or compute nodes CNs. A single host, i.e. a single compute node CN, can belong to several host aggregates HAs within the same availability zone AZ. Host aggregates HAs and availability zones AZs are normally created by the cloud administrator.

The availability zones AZs form the end-user visible logical abstraction for partitioning a cloud without knowing its physical infrastructure. Host aggregates HAs can be regarded as a mechanism to further partition an availability zone AZ. While availability zones AZs are visible to users, host aggregates HAs are only visible to the cloud administrator. A host aggregate HA is a group of hosts or compute nodes CNs that share a common attribute or capability, e.g. a group of hosts with same hardware configuration. It is possible to create efficient and scalable resource tiers using host aggregates HAs.

The cloud computing system 1 illustrated in FIG. 3A comprises head nodes HNs and several compute nodes CN1 to CN5. It further comprises a NFS server and a cloud switch (not shown). Each head node HN of the cloud computing system 1 comprises a cloud controller 112 and compute resources 110. In contrast the compute nodes CNs of the cloud computing system 1 provide only cloud compute resources 110. The cloud switch of the cloud computing system 1 provides network connectivity within an edge cloud. The NFS server is hosted in at least one head node HN with high availability.

FIG. 3B illustrates a compute node failure in host aggregate HA1 of the cloud computing system 1. Host aggregate HA1 comprises compute nodes CN1, CN2. The other host aggregate HA2 comprises compute nodes CN3, CN4, CN5.

In the illustrated example compute node CN2 in host aggregate HA1 fails (indicated with a cross). Backups of the virtual machines VMs on which virtual functions of the service chain SC are deployed can be generated to provide snapshot states of the respective virtual machines VMs. The backups of the virtual machines VMs of the service chain SC can be generated periodically and/or in response to a configuration change of a virtual network function VNF of the service chain SC deployed as virtual machines VMs across compute nodes CNs of said cloud computing system 1 shown in FIG. 3A.

A status of resources of the compute nodes CN1 to CN5 hosting the virtual machines VMs on which virtual functions of the service chain SC are deployed is monitored. In the given example of FIG. 3B a failure of resources of the compute nodes CN2 in host aggregate HA1 of the cloud computing system 1 is detected.

In response to the detected compute node failure an over-allocation of resources is allowed and a repositioning of virtual machines VMs on which virtual functions of the service chain SC are deployed is automatically performed. The resources of the compute nodes CNs comprise different resource types including computational resources, memory resources (RAM), hard disk resources and networking resources. Each virtual machine VM contains a set of its own virtual hardware and there are four primary resources that a virtual machine VM needs in order to correctly function. These resources are CPU, memory, network, and hard disk. For each resource type an associated resource allocation ratio RAR is provided indicating a ratio between virtual resources allocated to a virtual machine VM and available physical resources. The original resource allocation ratio RAR can be for instance one for some or for all resource types (RAR=1):
CPU allocation ratio=1
RAM allocation ratio=1
Disk allocation ratio=1

The allowed resource allocation ratio RAR can be increased temporarily e.g. to two (RAR=2) to provide a resource over-commitment (i.e. an overcommit ratio):

CPU allocation ratio=2
RAM allocation ratio=2
Disk allocation ratio=2

A resource allocation limit specifies an upper bound for CPU, memory, or storage or I/O resources that can be allocated to a virtual machine VM. A server can allocate more than a reservation to a virtual machine VM, but does not allocate more than the resource allocation limit, even if there are unused resources on the system.

The virtual machines VMs from the failed compute node CN2 are recreated in compute node CN1 of the same host aggregate HA1. The virtual machines VMs are repositioned or migrated from the detected failed resources to other working resources of other compute nodes CNs of the affected service chain SC. In the illustrated example of FIG. 3B the virtual machines VMs are repositioned or migrated from the detected failed resources of the affected failed compute node CN2 to working resources of the other compute nodes CN1 of host aggregate HA1. As soon as a compute node failure of compute node CN2 assigned to a host aggregate HA1 is detected virtual network functions VNFs of the failed compute node CN2 are launched from the failed compute node CN2 to at least one other compute node CN of the respective host aggregate HA1, i.e. to compute node CN1. The virtual network functions VNFs launched from the failed compute node CN2 to the other compute node CN1 of the respective host aggregate HA1 are rebuilt automatically using the last backup of the virtual machines VMs of the failed compute node CN2. Finally in the repositioned virtual machines VMs of the service chain SC are initialized to their last snapshot states.

In a possible implementation of the method of the present invention, each compute node CN forms part of a host aggregate HA. For instance, compute nodes CN1 and CN2 belong to host aggregate HA1. During service chain operation a VNF-A is spined up in a compute node CN of host aggregate HA1. On every configuration change in the VNF-A, an incremental volume backup is taken (not touching the base qcow2) and merged to the first volume backup. The latest back up can be available in a cinder database. The latest volume backup (VNF-1_backup.latest) of the VNF-A is transferred to the host aggregate HA1, and the older backups can be removed. That is the volume back up is available in CN1 and CN2.

Upon detecting that compute node CN2 in host aggregate HA1 has failed, the resource capacity in the other compute nodes CNs within the same host aggregate HA1 are evaluated and the resource allocation ratio RAR is increased temporarily to accommodate the VNFs from the failed compute node CN2. Upon detecting that the compute node CN2 has failed, all virtual machines VMs are automatically moved to other compute nodes CNs in the same host aggregate HA.

All the virtual machines VMs can be moved to other compute node CN in the same host aggregate HA or a specific virtual machine VM can be moved to other compute node CN in the same host aggregate HA.

A specific virtual machine VM can be moved to another compute node CN in the same host aggregate HA (e.g. a nova host evacuate can be executed). This will launch all the VNFs from the failed compute node CN2 to the still fully functioning compute node CN1 of the affected host aggregate HA1. The virtual network functions VNFs that are launched from compute node CN2 to compute node CN1 of host aggregate HA1 can be rebuilt using the virtual network function VNF-A_backup.latest images so that they move to the Day-N configurations.

If a hardware malfunction or another error causes a cloud compute node CN to fail instances, in particular VNF instances can be evacuated to make them available again. To preserve user data on a server disk, it is possible configure shared storage on a target host. When the instance is evacuated it can be determined whether shared storage is available on a target host. There are two different ways to evacuate instances from a failed compute node CN. The first way is to move a specific virtual machine VM to at least one other compute node CN in the same host aggregate HA (e.g. by using a command to evacuate a single instance from a failed compute node CN). In some cases where the monitored compute node CN does host many instances one can use another command to evacuate them all in one shot.

FIG. 3C shows diagrammatically a compute node restoration. When a user has detected or observed that the compute node CN2 in host aggregate HA1 has failed (see FIG. 3B), an operator can provision a replacement compute node CN2new replacing physically the failed compute node CN2. The virtual machines VMs can be migrated back to the replacement compute node CN2new. Finally the resource allocation ratio RAR of host aggregate HA1 can be restored back to its original value (e.g. RAR=1). A Management Orchestration (MANO) comprising an algorithm can be used to detect automatically the addition of the compute node CN2new and rebalancing the VNFs. The algorithm discovers the new compute node CN2new automatically and computes the resource capacity of the compute nodes CN2new and C1 of the host aggregate HA1. It identifies the available resources and the used resources of CN1 and CN2new. In particular, it identifies the used resources with a predefined resource allocation ratio RAR of, e.g., one (RAR=) 1.

FIG. 4 shows a flowchart of a further possible embodiment of the computer-implemented method according to the present invention. The flowchart is divided in three parts, i.e. VNF workload backup (steps S1 to S4), VNF bring up with minimized downtime (steps S5 to S8) and compute node restoration (steps S9 to S11).

The flowchart illustrates an automatic service chain recovery of a running service chain SC in response to a detected compute node failure (Steps S1 to S8) and a following compute node restoration (steps S9-S11).

The first four steps S1 to S4 are providing a VNF workload backup of a running service chain SC:

In step S1 an incremental backup of the VNF is taken.

In step S2 the incremental backup of the VNF is merged to the base backup.

In step S3 the backup is pushed to the HA image cache in the compute node CN.

In step S4 it is detected that a compute node CN has failed in an host aggregate HA.

In steps S5 to S8 the VNF is brought up with minimized downtime:

In step S5 the resource allocation ratio RAR in the host aggregate HA is increased.

In step S6 Nova Evacuate is executed of the detected failed compute node CN.

In step S7 VNF comes up in another compute node CN with day-0 configuration.

In step S8 the VNF is rebuilt using the latest backup image.

The last three steps S9 to S11 are performed to achieve a compute node restoration:

In step S9 it is detected that a replacement compute node CNnew is added to the host aggregate HA.

In step S10 candidates for a VNF list for migration are provided.

In step S11 the VNFs are rebalanced in the host aggregate HA.

A MANO algorithm can be used to detect automatically the addition of a compute node CN in step S9 and rebalancing the VNFs in step S11. The algorithm discovers a new compute node CNnew automatically and computes the resource capacity of the new compute node CNnew and the other compute nodes CNs of the respective host aggregate HA. It identifies the available resources in the host aggregate HA and the compute nodes CNs in that host aggregate HA. It identifies the used resources in all compute nodes CNs of the host aggregate HA with a predefined resource allocation ratio RAR of e.g. one (RAR=) 1. The algorithm creates a sorted list of VNFs that can be migrated from a failed compute node CN to at least one other still operable compute node CN in the same host aggregate HA. The VNF that has the least uptime is picked and its requirements for resources (cpu, memory, disk) and other hardware requirements in the affected CN are checked. If all the filters are passed then the VNF is added to the recommended VNF list of movement. An automatic live migration of the VNF to another operable compute node CN is performed with assistance of the NFS server (provided in head node HN as the shared storage). Then it is checked whether the compute nodes CNs in the host aggregate HA are balanced from a resource point of view. If the balancing point is not yet reached the above steps are repeated.

FIG. 5 illustrates possible use cases of the computer implemented method according to the present invention. The computer implemented method can be applied to a cloud computer system 1 formed by a local cloud computing system provided at the customer edge 201. FIG. 5 also shows a device edge 200, a far edge 202, a telco cloud edge 203, a telco cloud core 204, a public cloud 205 and a private cloud 206. Use cases drive requirements include, for instance, Apps and/or a SASE endpoint (on the device edge 200), uCPE, IoT, SD-WAN and/or Micro-cloud (on the customer edge 201), vRAN and/or MEC (on the far edge 202), EPC (on the telco cloud edge 203) and OSS or BSS (on the telco cloud core 204).

The cloud computer system 1 can fulfil a demand from enterprises for on-premises cloud solutions. With the assistance of the cloud computer system 1, enterprises can harness edge computing to meet low-latency requirements for applications such as private 5G, augmented reality (AR) and smart manufacturing. In the cloud computer system 1 VNF migration can save end users from needing to purchase dual VNF licenses. A smaller number of necessary processor cores and less consumed memory is a further advantage of using a local cloud computing system 1. Orchestrated services can span multiple compute nodes CNs. VNF migration policies between compute nodes CNs can be applied by automated host aggregates HAs. The cloud computer system 1 provides cloud-level view or management of the site, or service topology at the site. Host aggregates HAs and inter-node services are orchestrated and do not need to be manually configured outside of the cloud computer system 1. The compute nodes CNs of the local cloud computer system 1 have a smaller footprint thus making more resources available for the application.

The cloud computer system 1 shown in FIGS. 3A, 3B, 3C and in FIG. 5 provides a low latency while providing an increase in scale, elasticity, reliability as well as an in bandwidth. Some applications require low-latency access to compute resources or compute nodes CNs. Examples of such applications include private 4G and 5G, IoT, augmented reality (AR), virtual reality (VR) and smart manufacturing. The local cloud computer system 1 allows reduced backhaul. Applications like video surveillance produce high volumes of data, only some of which contain useful information. Applying local pattern recognition and analysis is a way to reduce the volume of uplink traffic. By processing the video stream locally in the cloud computer system 1, the required uplink can be drastically reduced because only alerts or aggregated data are sent upstream. The local cloud computer system 1 provides also increased autonomy and data sovereignty. Some companies, industries and jurisdictions have requirements for keeping data local. In contrast a centralized cloud requires transporting data out of the specified area and so does not form an option in those cases. The cloud computer system 1 provides standalone resiliency. If an application is hosted centrally and a network link fails the application cannot continue. In contrast local hosting of the application in the cloud computer system 1 as shown in FIGS. 3A, 3B, 3C and in FIG. 5 provides the ability to keep going until the network link is restored. The use of a cloud computer system 1 moreover provides lower costs. A centralized cloud may have a lot of benefits, but reservation of resources can be expensive for applications that have to run all the time.

With the computer implemented method according to the present invention there is no need for additional standby compute nodes CNs to build the VNF HA in the service chain SC, thereby reducing the hardware cost. The method does not require a predictive model which is not 100% accurate and which needs manual monitoring and intervention to have a continued service chain SC with no down time. With the computer-implemented method according to the present invention there is no need to provide for the recovery of the service chain SC any additional stand-by compute nodes CNs. The computer implemented method is always accurate as the action is taken after a compute node CN really fails and is not based on a prediction model.

The computer implemented method according to the present invention ensures a NFV service chain continuity automatically, without any manual intervention. After a replacement compute node CNnew is brought to the cloud computing system 1, a MANO can automatically detect and rebalance the workload on the compute nodes CNs. Artificial intelligence (AI) technology can be integrated into distributed MANO responsible for resource orchestration. In a 6G network, an AI-driven MANO can provide the system's traffic prediction and allocates the resources based on the traffic forecast.

What is claimed is:

1. A computer-implemented method for providing an automatic recovery of at least one service chain comprising a network function virtualization (NFV) service chain including interlinked virtual network functions deployed as virtual machines across multiple compute nodes of a cloud computing system, the compute nodes belonging to host aggregates, each including compute nodes having a common attribute or common capability, the method comprising the steps of:

generating backups of the virtual machines on which virtual functions of the service chain are deployed to provide snapshot states of the respective virtual machines;

monitoring a status of resources of the compute nodes hosting the virtual machines on which virtual functions of the service chain are deployed to detect failed resources of the compute nodes;

allowing over-allocation of resources and performing a repositioning of virtual machines on which virtual functions of the service chain are deployed from the detected failed resources to other working resources of the compute nodes of the service chain, wherein if a compute node failure of a compute node assigned to a host aggregate is detected a resource capacity in the respective host aggregate is evaluated and resource allocation ratios of one or more resource types in the respective host aggregate are increased temporarily to accommodate the virtual network functions of the failed compute node; and initializing the repositioned virtual machines of the service chain to their last snapshot states.

2. The computer-implemented method of claim 1 wherein the resources of the compute nodes comprise different resource types including computational resources, memory resources, hard disk resources and networking resources.

3. The computer-implemented method of claim 2 wherein for each resource type an associated resource allocation ratio is provided indicating a ratio between virtual resources allocated to a virtual machine and available physical resources.

4. The computer-implemented method of claim 1 wherein if the compute node failure of the compute node assigned to the host aggregate is detected virtual network functions of the failed compute node are launched from the failed compute node to at least one other compute node of the respective host aggregate.

5. The computer-implemented method of claim 4 wherein the virtual network functions launched from the failed compute node to the other compute node of the respective host aggregate are rebuilt automatically using a last backup of the virtual machines of the failed compute node.

6. The computer-implemented method of claim 5 wherein the failed compute node is replaced by another replacement compute node added to the respective host aggregate.

7. The computer-implemented method of claim 6 wherein the replacement compute node added to the respective host aggregate is automatically discovered.

8. The computer-implemented method of claim 7 wherein resource capacities of the discovered replacement compute node and of other compute nodes of the respective host aggregate are determined.

9. The computer-implemented method of claim 8 wherein a workload of compute nodes of the respective host aggregate is rebalanced automatically by a Network Functions Virtualization Management and Orchestration layer to restore an original resource allocation ratio in the respective host aggregate by migration of virtual network functions to the discovered replacement compute node on the basis of the determined resource capacities.

10. The computer-implemented method of claim 1 wherein the cloud computing system comprises a customer edge cloud provided at a customer premise with a localized cloud control provided by local cloud controllers of the customer edge cloud.

11. The computer-implemented method of claim 1 wherein the backups of the virtual machines of the service chain are generated periodically and/or in response to a configuration change of a virtual network function of the service chain deployed as virtual machines across compute nodes of said cloud computing system.

12. A cloud computing system comprising interlinked virtual network functions of a service chain comprising a network function virtualization (NFV) service chain including interlinked virtual network functions deployed as virtual machines across multiple compute nodes of the cloud computing system, the compute nodes belonging to host aggregates, each including compute nodes having a common attribute or common capability, the cloud computing system comprising:

a backup generation unit adapted to generate backups of the virtual machines of the service chain to provide snapshot states of the respective virtual machines;

a failure detection unit adapted to monitor a status of resources of the compute nodes of the service chain to detect failed resources of the compute nodes; and an orchestration unit adapted to perform a reallocation of resources and a repositioning of virtual machines of the service chain from the failed resources detected by the failure detection unit to other working resources of the compute nodes of the service chain and to adapted to initialize the repositioned virtual machines of the service chain to their last snapshot states provided by the backup generation unit, wherein if a compute node failure of a compute node assigned to a host aggregate is detected by the failure detection unit, a resource capacity in the respective host aggregate is evaluated and resource allocation ratios of one or more resource types in the respective host aggregate are increased temporarily by the orchestration unit to accommodate the virtual network functions of the service chain deployed on virtual machines hosted by the failed compute node.

13. The cloud computing system of claim 12 wherein the resources of the compute nodes comprise different resource types including computational resources, memory resources, hard disk resources and networking resources and wherein for each resource type an associated resource allocation ratio is provided indicating a ratio between virtual resources allocated to a virtual machine and available physical resources.

14. The cloud computing system of claim 12 wherein if the compute node failure of the compute node assigned to the host aggregate is detected by the failure detection unit of the cloud computing system virtual network functions of the service chain deployed on virtual machines hosted by the failed compute node are launched by the orchestration unit of the cloud computing system from the failed compute node to at least one other compute node of the respective host aggregate.

15. The cloud computing system of claim 14 wherein the virtual network functions launched from the failed compute node to the other compute node of the respective host aggregate are rebuilt automatically using a last backup of the virtual machines of the failed compute node provided by the backup generation unit of the cloud computing system.

16. The cloud computing system of claim 12 wherein the failed compute node detected by the failure detection unit of the cloud computing system is replaced by another replacement compute node added to the respective host aggregate.

17. The cloud computing system of claim 16 wherein the replacement compute node added to the respective host aggregate is automatically discovered and resource capacities of the discovered replacement compute node and of other compute nodes of the respective host aggregate are determined.

18. The cloud computing system of claim 17 wherein a workload of compute nodes of the respective host aggregate is rebalanced automatically by the orchestration unit of the cloud computing system to restore an original resource allocation ratio in the respective host aggregate by migration of virtual network functions to the discovered replacement compute node on the basis of the determined resource capacities.

19. The cloud computing system of claim 12 wherein the cloud computing system comprises a customer edge cloud provided at a customer premise with a localized cloud control provided by local cloud controllers of the customer edge cloud.

20. The cloud computing system of claim 12 wherein the backups of the virtual machines of the service chain are generated by the backup generation unit of the cloud computing system periodically and/or in response to a configuration change of a virtual network function of the service chain deployed as virtual machines across compute nodes of the cloud computing system.

21. The cloud computing system of claim 12 wherein the orchestration unit of the cloud computing system comprises a Network Functions Virtualization Management and Orchestration layer adapted to restore an original resource allocation ratio in the respective host aggregate by migration of virtual network functions to a discovered replacement compute node on the basis of determined resource capacities.

* * * * *